United States Patent

Rudolph et al.

[15] 3,707,655

[45] Dec. 26, 1972

[54] A SEMICONDUCTOR DEVICE HAVING PAIRS OF CONTACT AREAS AND ASSOCIATED SUPPLY CONDUCTOR POINTS OF ATTACHMENT IN A PREFERRED ARRANGEMENT

[72] Inventors: Joannes Gerard Rudolph; Gerard Moesker, both of Mollenhutsweg, Nijmegen, Netherlands

[73] Assignee: U.S. Philips Corporation, New York, N.Y.

[22] Filed: Sept. 9, 1970

[21] Appl. No.: 70,761

[30] Foreign Application Priority Data

Sept. 11, 1969 Netherlands ........................6913812

[52] U.S. Cl............317/234 R, 317/234 N, 317/101, 29/590

[51] Int. Cl...............................H01l 3/00, H01l 5/00

[58] Field of Search.......317/234, 235, 1, 5, 5.4, 101; 29/589, 591, 590, 471.1; 355/132; 174/DIG. 3

[56] References Cited

UNITED STATES PATENTS

| | | | |
|---|---|---|---|
| 3,376,635 | 4/1968 | Moesker | 29/589 X |
| 3,537,175 | 11/1970 | St. Clair et al. | 317/234 N |
| 3,539,259 | 11/1970 | Hillman et al. | 174/DIG. 3 |
| 3,562,592 | 2/1971 | Cooke | 317/234 |

OTHER PUBLICATIONS

IBM Technical Bulletin, Vol. 8, No. 11, Apr. 1966, page 1541, by Chiou et al.

*Primary Examiner*—John W. Huckert
*Assistant Examiner*—Andrew J. James
*Attorney*—Frank R. Trifari and David Fink

[57] ABSTRACT

A semiconductor device features pairs of contact areas and associated supply conductor points of attachment in a preferred arrangement which facilitates the manufacturing of the device. The intersection of the locus of all the lines defined by each contact area and associated supply conductor point of attachment is a single point.

5 Claims, 12 Drawing Figures

*INVENTORS*

JOANNES G. RUDOLPH
GERARD MOESKER

*BY* [signature]

AGENT

*INVENTORS*

JOANNES G. RUDOLPH

*BY* GERARD MOESKER

AGENT

INVENTORS
JOANNES GERARD G. RUDOLPH MOESKER
BY Frank R. Trifari
AGENT

INVENTORS
JOANNES G. RUDOLPH
GERARD MOESKER
BY
AGENT

A SEMICONDUCTOR DEVICE HAVING PAIRS OF CONTACT AREAS AND ASSOCIATED SUPPLY CONDUCTOR POINTS OF ATTACHMENT IN A PREFERRED ARRANGEMENT

This invention relates to a method of forming electrical connections between contact areas on a semiconductor device and associated points of attachment on supply conductors with the use of a tool which can move relative to the semiconductor device and the supply conductors located next to it. The semiconductor device may be a semiconductor circuit integrated in a single body having contact areas formed by thin conductive metal layers located on the surface of the semiconductor body, possibly through the intermediary of insulating layers. The supply conductors may be formed, for example, by tongues punched out of a metal strip, which tongues are still joined and thus form an assembly while making the electrical connections. The conductors are made electrically insulated from one another afterwards. As an alternative, the supply conductors may be sealed in an enclosure. An envelope often used for this purpose is known under the name "-flat-pack."

The invention also relates to a semiconductor structural element as manufactured by the use of the inventive method.

It is known to form the electrical connections by means of thin metal wire, for example of gold or aluminum with approximately 25 $\mu$ thickness. Various methods are also known for securing the wire ends to the contact areas and to the points of attachment on the supply conductors. In one method, a thicker end of the wire is first secured to a contact area by thermocompression bonding and the other end is then secured to the supply conductor. Also, methods are known in which the wire is secured by pressing it against the contact area or the supply conductor with the use of a wedge- or chisel-shaped body. These methods may be combined with an ultrasonic treatment.

By the operations, the semiconductor device and the assembly of supply conductors are in general first mechanically united, for example by soldering the device to a supply conductor or securing it to the base of the envelope, whereupon the assembly is fixed in position on a table, while the tool for forming the connections arranged above the table can relatively move with respect thereto. To establish each attachment, either at a contact area on the semiconductor device or at a point of attachment on a supply conductor, a positioning of the tool with respect to the table will usually be required and this usually amounts to establishing two positionings for each wire to be connected. U.S. Pat. No. 3,376,635 describes a method in which a wire connection is made using only one positioning and in which even two connecting wires can be secured via only one positioning. This method will be briefly explained with reference to FIGS. 1, 2 and 3, which show diagrammatically plan views on a semiconductor device and an assembly of supply conductors.

The semiconductor device and its two contact areas are indicated by 1 and 2, respectively. The current supply conductors are, in this example, included in the circular base 3 of a transistor envelope and the top ends of the supply conductors, which also form the points of attachment for the connections to be made, are designated 4.

It has been assumed that the tool (not shown) for making the connections occupies a fixed position relative to the axes of coordinates X and Y. Before making the connections, the semiconductor device with the assembly of supply conductors formed integrally with it and the tool are moved from the position shown in FIG. 1 into the position shown in FIG. 2. The position of FIG. 1 is comparatively arbitrary. In the position of FIG. 2 all components are placed symmetrically relative to the coordinates. This prealignment is common and is generally achieved by two rectilinear movements in parallel with the X- and Y-axes respectively and a rotation through an angle $\alpha$ about the center of the semiconductor device. FIG. 3 shows the manner in which two connections 5 have subsequently been made. The widened portions 6 indicate that the wires forming the connections with the contact areas and the supply conductors, respectively, have been secured with the use of wedges by wedgebonding.

In the example shown, two contact areas have been connected to two supply conductors, which may be sufficient for a transistor. The number of contact areas will usually be much more than two in integrated semiconductor circuits. Circuits of this kind are common and sometimes have a large number of contact areas arranged in a circle. Such contact areas can be connected to a large number of supply conductors in a comparatively simple manner when the latter are likewise arranged in a circle around the circle of the contact areas, by making the assembly rotate in steps about the center of the circles which centers are laid in the origin of the crossing of the X—Y axes and by forming in each case connections between associated contact areas and supply conductors.

However, this method sets serious limitations to the design of the integrated semiconductor circuit: it will usually be easier to arrange the desired circuit if the contact areas need not lie in a circle and, more particularly, if the semiconductor body in which the semiconductor circuit is to be formed is of a rectangular or square shape. In the latter case it may, for example, be preferable to place the contact areas in straight rows along the edges of the semiconductor body.

An object of the present invention is inter alia to provide, also for this case, a simple method of forming the connections and also a method of placing the contact areas and the points of attachment on the supply conductors so that the making of the connections is simplified.

According to the invention, the pairs of contact areas and associated points of attachment, between which a connection is made, are positioned on lines which pass through one center, and the distances of the pairs of areas and points from the center are made relatively different. The relative displacement of the tool and the semiconductor device, between the making of one connection and a subsequent connection is composed of a rotation about the center and a radial displacement with respect thereto. The displacement here described is not intended to mean the displacement necessary for the prealignment.

The center of the connecting lines is preferably laid at the center of the semiconductor device, but it could alternatively be chosen outside it, more particularly if the semiconductor device is of an elongated narrow shape.

In one advantageous embodiment of the invention, the distances between the contact areas and the associated points of attachment are made the same. In this case, the tool making the connections need be adapted only for connections of one specific length.

If, however, the structure of the semiconductor device permits, then in another embodiment of the invention one can have a number of groups of contact areas and associated points of attachment wherein the distance between these areas and points is the same in each group, but is different for the various groups. In this case the tool, after the connections in one group have been made, is adjusted to an other length of connections before making them in a subsequent group.

The contact areas are preferably arranged in a known manner in a number of straight rows along one or more edges of the semiconductor device.

In another advantageous embodiment of the invention, the relative displacement of the tool, and the semiconductor device is composed of a rotation of the semiconductor device together with the supply conductors formed into an assembly, about the center and a radial displacement of the tool with respect to the center.

The method according to the invention is especially adapted for the use of a multiplex tool which in each case forms two radially opposite connections, the two parts of the tool making the connections being movable in radially opposite directions.

If there are groups of contact areas and points of attachment where the distance between these areas and points is the same in each group, but is different for different groups, then in another embodiment of the invention the tool may be so adjusted that its two parts form connections of different lengths. As a matter of fact, such connections are radially opposite one another.

The invention further relates to a semiconductor structural element comprising a semiconductor device having a certain number of contact areas and a certain number of supply conductors united into an assembly and wherein electrical connections between the connections between the contact areas and the associated points of attachment have been made. Such a structural element is characterized in that the contact areas and the associated points of attachment are located on lines which pass to one center, and that the distances of the thus formed pairs of areas and points from this center exhibit differences. The structure is preferably chosen so that the center of said lines lies at the center of the semiconductor device. Furthermore, the distances between the contact areas and the associated points of attachment are preferably the same.

In another preferred embodiment of this structural element there are groups of contact areas and associated points of attachment wherein the distances between pairs of contact areas and points are the same in each group, but are different for the different groups. There are preferably two such groups, pairs of contact areas and points of attachment which have different spacings between them being in each case located diametrically in opposition.

In order that the invention may be readily carried into effect, it will now be described in detail, by way of example, with reference to several embodiments shown in the accompanying drawings.

Figures 1, 2, 3, 4, 5:
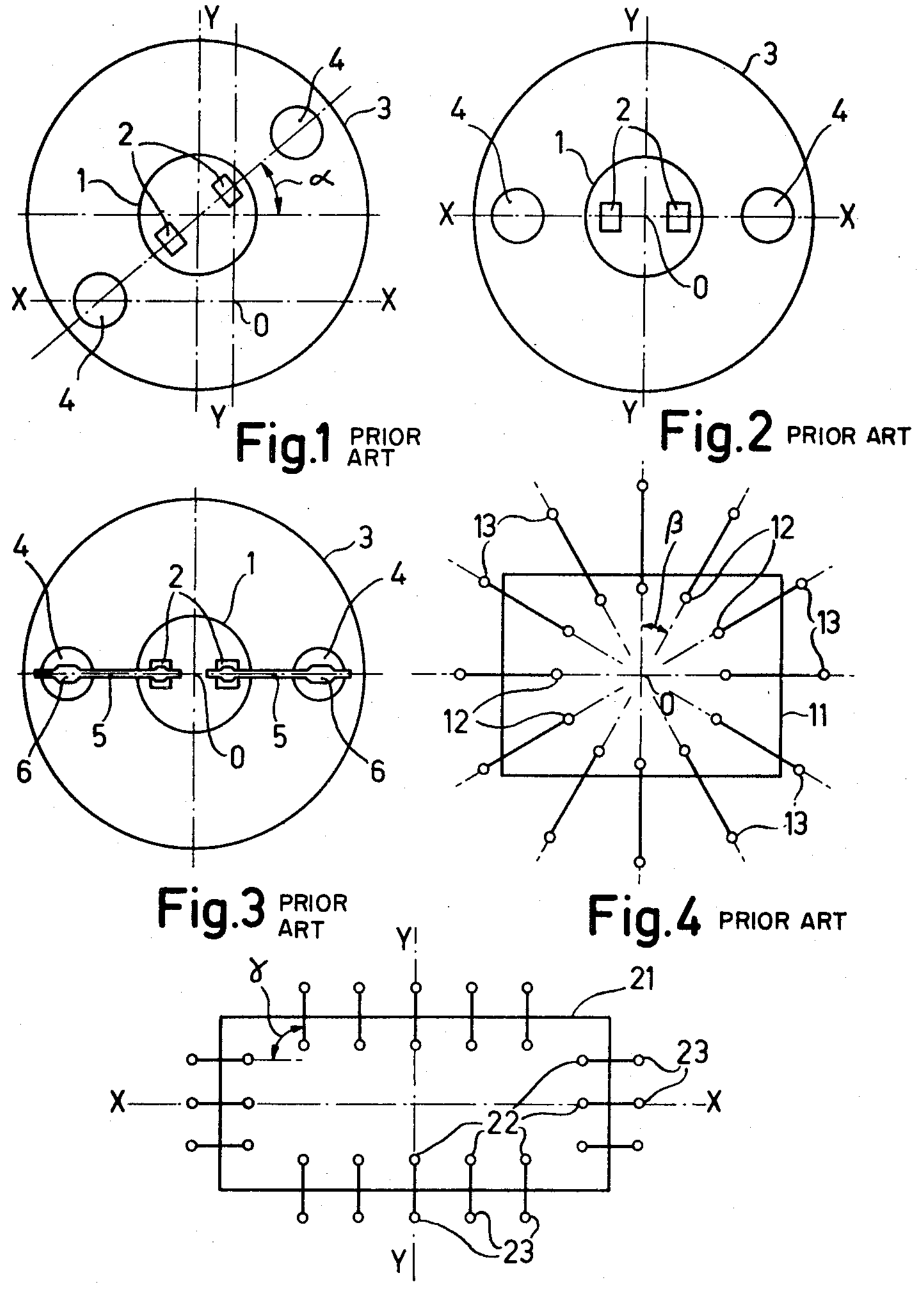
Fig.1 PRIOR ART, Fig.2 PRIOR ART, Fig.3 PRIOR ART, Fig.4 PRIOR ART, Fig.5 PRIOR ART
FIGS. 4 to 10 are diagrammatic plan views on semiconductor devices and their connections to the supply conductors.

In addition to the previous description of the known techniques and for better understanding of the problems solved by the present invention, FIG. 4 shows an integrated semiconductor device 11 in the form of a rectangular body provided with 12 contact areas 12, arranged in a circle, which are surrounded by twelve points of attachment 13 on supply conductors (not shown). It will be evident that a tool arranged above this assembly can form connections between associated contact areas 12 and points of attachment 13 in a comparatively simple manner, when the semiconductor device is in each case rotated through an angle of 30°. However, it is usually not easy to bring the circular location of the contact areas 12 on the semiconductor device 11 in conformity with the internal structure of the circuit. Furthermore, several of the connections and more particularly those which extend across the corners become very long, so that, if the connections are to be the same length, as is preferable for tools forming the connections, all of the connections have to become long and the assembly will occupy considerable space. Besides, the risk of shortcircuit is thus increased.

FIG. 5 shows a configuration of a rectangular semiconductor body 21 with its contact areas 22 provided in four rows along the edges. The points of attachment 23 on the conductors (not shown) are likewise placed in four rows. All of the connections can acquire the same length, but the positioning of the tool forming the connections is now comparatively complicated. It requires a large number of rectilinear movements in parallel with the X- and Y-axes and also one or more rotations through an angle $\gamma$ of 90°.

Figure 6:
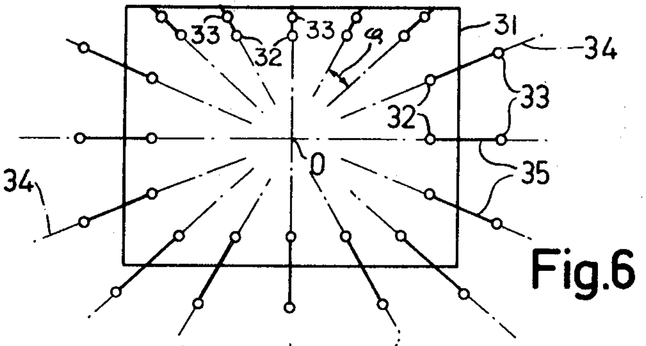

FIG. 6 shows a semiconductor device 31, adapted for use of the method according to the invention, in which the contact areas 32 are again arranged in four straight lines along the edges of the semiconductor body. They are located together with the associated points of attachment 33 on the supply conductors (not shown) on lines 34 which extend through the center O. In the example shown, these lines form relatively equal angles $\phi$ of 22.5°, so that 16 connections 35 can be made, all of which are of the same length.

The connections can be formed with a tool which can be positioned in a very simple manner. After the usual prealignment has taken place for making the center of rotation of the tool coincide with the center of the contact areas and the points of attachment, the semiconductor device together with the assembly of supply conductors need, in each case, be rotated only through an angle of 22.5° and the tool need be shifted slightly in the radial direction for matching to the different distances of the connections from the center.

Tools of this kind which can form two diametrically opposite connections at the same time are known and described in U.S. Pat. No. 3,376,635. When using such a tool, the 16 connections 35 can be formed in eight steps.

Since the positioning in the method according to the invention is simple, it lends itself very well for a numerical control. They are only two degrees of freedom, namely the angular displacement $\phi$ and the displacement of the tool in the radial direction, so that the numerical control is materially simplified with respect to the method in which displacements in the X- and Y-directions and an angular displacement — thus three degrees of freedom — are required. The whole treatment after a prealignment, which will usually be effected manually, may therefore be accomplished automatically in a comparatively simple manner.

Figure 7:
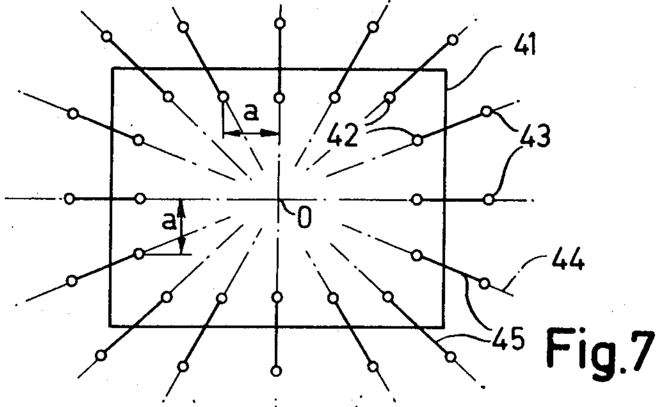

It is, of course not necessary for the angular displacement between the steps to be maintained constant. If the more complicated control necessary for adjusting different angular displacements between the steps is not objectionable, it is possible to arrange the contact areas at relatively equal distances in rows, as shown in FIG. 7. In FIG. 7, the semiconductor device 41 has four rows of contact areas 42. The mutual distances in each row are equal to *a*, which naturally results in the lines 44 through the center O, on which the contact areas are located to form relatively different angles. Allowance must be made for this in positioning the tool.

In the examples of FIGS. 6 and 7, the connections 35, 45 between all pairs of contact areas 32, 42 and the associated points of attachment 33, 43 had the same length, so that the tool forming these connections need be adjusted only to one distance. There may be circumstances in which it is advantageous to deviate from this condition. Thus, it may be desirable in certain semiconductor devices to have one row of contact areas placed at a distance from an edge different from other rows in order to have a strip of the surface available for providing integrated resistances. In this case it may be advantageous to form two rows of connections of different lengths.

Figure 8:
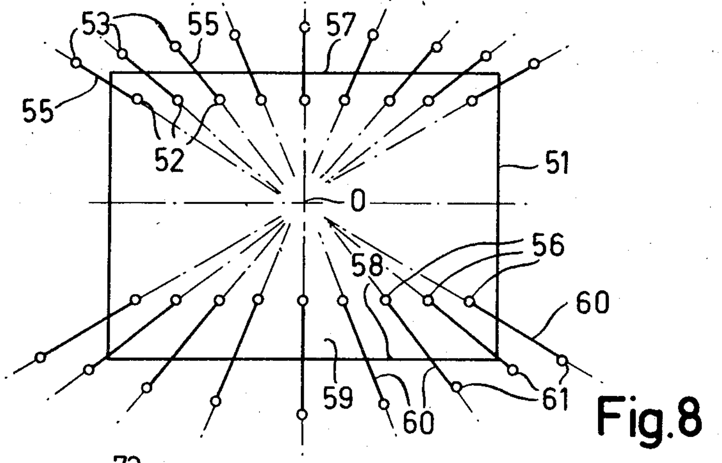

FIG. 8 shows a semiconductor device 51 in the form of a rectangular body having nine contact areas 52 along its upper edge 57. Nine contact areas 56 are also present along the lower edge 58, but their distance from the edge 58 is greater than the distance of the contact areas 52 from the edge 57. This has made available a strip 59 in which circuit elements can be integrated. The connections 55 between the contact areas 52 and the associated points of attachment 53 on the conductors are now shorter than the connections 60 between the contact areas 56 and the points of attachment 61. In this case, the connections may be formed in nine steps if a bipartite tool is used. As a matter of fact, one part of this tool must be adjusted to make the shorter connections. It is otherwise possible in this and other cases previously described, to utilize thermocompression bonding and the like where the length of each connection is different from the other lengths. The use of such methods also permits the important advantage that only one rotation and one radial displacement are required for positioning.

Figure 9:
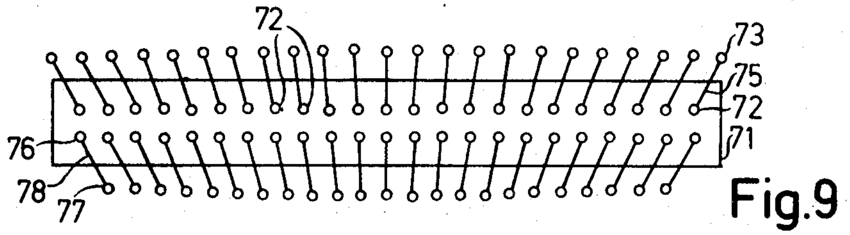

While in the examples of FIGS. 6, 7 and 8 the center of rotation of the tool lay at the center of the semiconductor device. This center lies wholly outside it in the example shown in FIG. 9. This Figure illustrates an elongated, narrow semiconductor device 71 in which a series of photo-sensitive elements may be integrated with a series of contact areas 72. Contact areas 72 are connected by wires 75 to the points of attachment 73 of supply conductors (not shown). The terminal points of the connections 75 lie on lines which pass through a center which lies outside the drawing and which is also the center of the rotation for the tool which has made the connections 75. The distances of the connections 75 from this center are relatively different so that a slight displacement in the radial direction was necessary. As an alternative, a second series of contact ares 76 could have been arranged along the lower edge of the device 71 together with associated points of attachment 77 on a series of conductors (not shown) and connections 78 could have then been formed.

Figure 10:
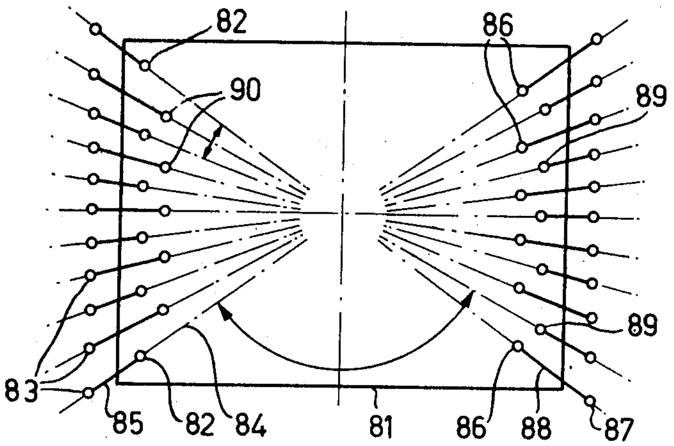

An example of a more complicated manner of arranging the contact areas is shown in FIG. 10. Along two opposite edges of a semiconductor device 81 there are provided series of contact areas 82 and 89, which lie comparatively close to the edge, and contact areas 90 and 86 at a greater distance. Points of attachment 83 and 87 lie next to the device. The contact areas 82 89, respectively, are connected to the points of attachment 83 and 87, respectively, by comparatively short electrical connections 85, whereas the contact areas 86 and 90, respectively, are connected to the points of attachment 87 and 83, respectively, by longer connections 88. The tool is adjusted to the forming of two radially opposite connections of different lengths.

It is then necessary to vary not only the spacing between the two parts of the tool but also the position of the center between these parts on the radial line 84. This manner of arranging the contact areas may afford advantages if it is important to place a large number of contact areas along an edge.

Figure 11:
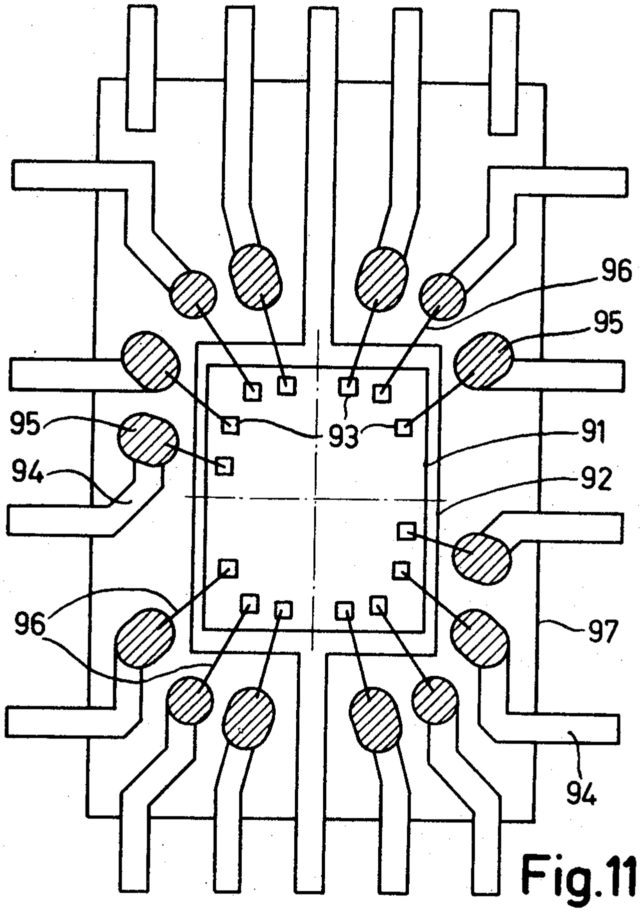
FIG. 11 is a plan view on a semiconductor device mounted on an assembly of conductors.

FIG. 11 shows a semiconductor device 91 which is soldered on a thin conductive plate 92. 14 contact areas 93 are provided on the upper face of device 91. The device 91 is surrounded by a plurality of conductors 94, of which the ends directed towards the center exhibit points of attachment 93 which are cross-hatched in FIG. 11. The contact areas 93 are connected to the associated points of attachment 95 by 14 conductors 96. These conductive connections 96 are of the same length and lie on radial lines which, with an exception, form equal angles with one another. When providing a semiconductor device on such an assembly of conductors 94, it is convenient to have conductors 94 constitute punched-out tongues in a surrounding frame, in order to fix them in position when the semiconductor device is soldered on. The conductive connections are formed and embedded in a thermosetting envelope, the periphery of which is shown by a rectangle 97 in FIG. 11.

Figure 12:
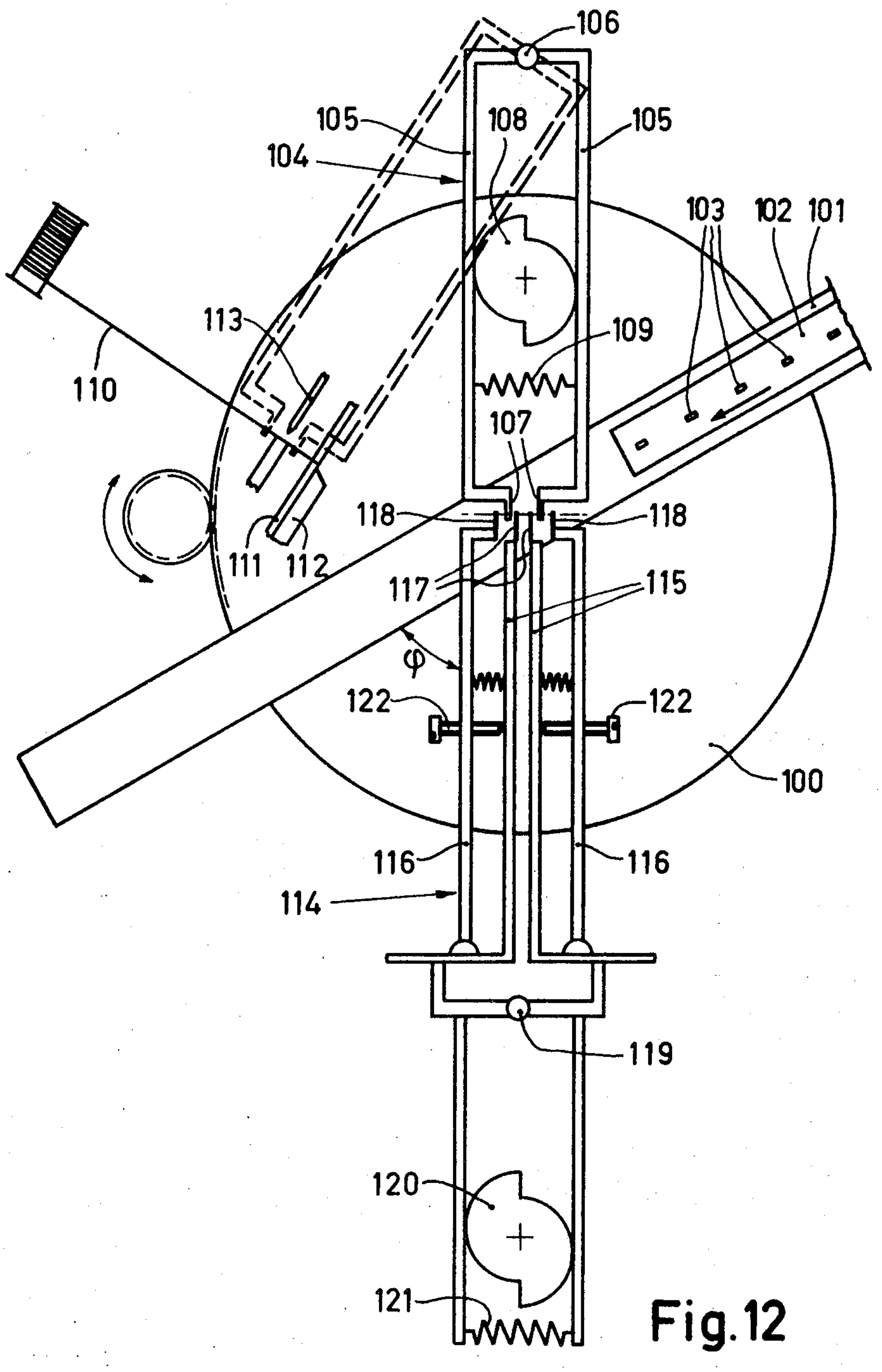
FIG. 12 shows an example of carrying out the method.

As has been described in the foregoing, the method of the invention may be carried out with the use of a tool which is shown diagrammatically in FIG. 12.

A rotary table 100 carries a feed member 101 for a metal strip 102. In this strip supply conductors have been punched out as tongues in a repeating pattern and in a frame surrounding them. A semiconductor body 103 is, in each case, secured to one conductor of an associated complex of conductors such as shown in FIG. 11. The strip 102 can be shifted discontinuously in the feed member 101, the center of associated supply conductors together with the semiconductor device secured thereto coming to lie over the center of the rotary table 100, the so-called prealignment.

A tong-shaped member 104 can bring two wire parts of given length above contact areas on the semiconductor body and the points of attachment on supply conductors which are to be connected. The tong-shaped member 104 has two arms 105 which are pivoted on a spindle 106 and each have jaws 107 for holding a wire part. The arms 105 are pivoted on the spindle 106 by means of a cam 108, a spring 109 urging the arms against the cam. The tong-shaped member 104 may be pivoted from the position shown in straight lines into the position shown in dotted lines, where the jaws 107 receive two wire parts of given length from a wire supply 110. U.S. Pat. No. 3,376,635 describes an example of the manner in which the wire parts are received by the tongs. The device for clamping the end of the supply wire as described in this example, the knife for cutting off the supply wire and the means of cutting the wire received by the jaws of the tongs 104 at the desired area, in order to obtain two wire parts of the length desired, are indicated by 111, 112 and 113, respectively, in FIG. 12.

The tool also comprises a mechanism 114 for securing the wire parts to the contact areas on the semiconductor device and to the points of attachment on the supply conductors. This mechanism, which is likewise shown diagrammatically, has two arms 115 and two arms 116 which are pivotally connected thereto. One extremity of each of the arms 115, 116 is provided with a chisel 117, 118 respectively for securing the wire parts to the contact areas and the THE points of attachment by means of a compression bonding. The two arms 115 are pivoted on a spindle 119. A cam 120 determines the distance between the chisels 117 on the arms 115, and a spring 121 presses the extension of the arms 115 against the cam. The distance between the chisels 117 and 118 may be adjusted by means of screws 122.

The table 100 is rotated through an angle such that two sets of contact areas and points of attachment to be connected are laid on a line passing through the center, which is shown in dotted line in FIG. 12. The arms 105 of the tong-shaped member 104, each carrying a wire part of desired length, are moved apart by means of cam 108 so that the ends of the wires lie over the contact areas and the points of attachment, the extension of the wires being located above the center. By means of cam 120, the chisels 117 are moved above the contact areas on the semiconductor body. The screws 122 are so adjusted that the chisels 118 lie above the points of attachment on the supply conductors. In this position, the two wire parts are simultaneously secured to the contact areas and the points of attachment by means of the chisels 117 and 118, respectively.

The radial displacement of the chisels 117, 118 and the jaws 107, which is caused by the interconnected cams 108 and 120, and the angular displacement of the table 100 preferably take place with numerical control. Since there are only two degrees of freedom, namely the radial displacement and the angular displacement, the numerical control may be obtained in a comparatively simple manner, in contrast to the prior art embodiment for making connections as shown in FIG. 5, wherein an angular displacement and two relatively perpendicular displacements must be brought about. The method according to the invention lends itself to mechanization and, in addition, has the possibility of a simple control.

What is claimed is:

1. A semiconductor device comprising a semiconductor body, a plurality of contact areas on the semiconductor body, a plurality of corresponding supply conductors each having an associated point of attachment, and means to conductively connect at least one of the supply conductors between an association contact area and the corresponding point of attachment, each of said contact areas and each of said corresponding point of attachment forming a pair lying along an imaginary line to thereby form a plurality of imaginary lines all of said imaginary lines having a common point of intersection, at least three of the distances from said common point of intersection to said contact areas being different.

2. A semiconductor device as claimed in claim 1, wherein said point of intersection lies at the center of the semiconductor device.

3. A semiconductor device as claimed in claim 1, wherein the separation between each of said contact areas and each of said corresponding points of attachment being substantially equal.

4. A semiconductor device as claimed in claim 1, wherein said contact areas comprise a plurality of groups, the separation between each of said contact areas and each of said corresponding points of attachment being the same for all the contact areas in one of said groups but different for different groups.

5. A semiconductor device as claimed in claim 3, wherein two of said groups are present, the separations between each of said contact areas and each of said corresponding points of attachment of one of said groups lying diametrically opposite the separations between each of said contact areas and each of said corresponding points of attachment of the other of said groups.

* * * * *